(12) United States Patent
Moe (10) Patent No.: US 11,194,056 B2
(45) Date of Patent: Dec. 7, 2021

(54) SURVEY SYSTEM WITH FIELD CALIBRATION

(71) Applicant: TRIMBLE INC., Sunnyvale, CA (US)

(72) Inventor: Ethan William Moe, Broomfield, CO (US)

(73) Assignee: Trimble Inc., Sunnyvale, CA (US)

( * ) Notice: Subject to any disclaimer, the term of this patent is extended or adjusted under 35 U.S.C. 154(b) by 413 days.

(21) Appl. No.: 16/431,142

(22) Filed: Jun. 4, 2019

(65) Prior Publication Data

US 2020/0386898 A1 Dec. 10, 2020

(51) Int. Cl.
*G01S 19/47* (2010.01)
*G01C 15/00* (2006.01)

(52) U.S. Cl.
CPC .............. *G01S 19/47* (2013.01); *G01C 15/00* (2013.01)

(58) Field of Classification Search
CPC ........ G01S 19/47; G01C 21/165; G01C 21/16
USPC ...................................................... 342/357.3
See application file for complete search history.

(56) References Cited

U.S. PATENT DOCUMENTS

| 10,969,494 | B2* | 4/2021 | Kipka | G01S 19/14 |
|---|---|---|---|---|
| 2015/0219455 | A1* | 8/2015 | Jordil | G01C 15/00 |
| | | | | 33/228 |
| 2015/0268045 | A1* | 9/2015 | Dusha | G01C 15/06 |
| | | | | 33/228 |
| 2019/0094388 | A1* | 3/2019 | Gorcke | G01C 15/06 |
| 2019/0271784 | A1* | 9/2019 | Teigland | G01S 19/42 |
| 2019/0302273 | A1* | 10/2019 | Sano | G01S 19/14 |

* cited by examiner

*Primary Examiner* — Harry K Liu
(74) *Attorney, Agent, or Firm* — Snell & Wilmer L.L.P.; Kent A. Lembke (57) ABSTRACT

A survey system configured to perform a calibration that eliminates, or at least significantly reduces, mechanical misalignment issues with the receiver or top unit (e.g., a GNSS receiver or the like), the mounting hardware, and the survey pole of the survey system. The survey system may include a data collector mounted upon the pole, and a calibration module (i.e., calibrating software and/or firmware) may be run or provided on the data collector or other component of the survey system (e.g., on the top unit). The calibration module processes data collected (including data from its inertial measurement unit (IMU)) by the top unit during calibration operations (or simply calibration) to determine a mounting angle and a correction factor (or corrections for attitude) based on this mounting angle, and the correction factor is communicated to the top unit for use in later data collection to improve accuracy of the survey system.

41 Claims, 5 Drawing Sheets

SURVEY SYSTEM WITH FIELD CALIBRATION

BACKGROUND

1. Field of the Invention

The present description generally relates to surveying equipment and systems such as those with receivers provided on or with survey poles, rods, or the like. More particularly, the present description is directed toward a survey system adapted to provide field or on-site calibration of a survey system, e.g., a system including a receiver mounted on a survey pole, as an initial step of the surveying process or operation.

2. Relevant Background

Surveying or land surveying is the technique of determining the terrestrial or three-dimensional (3D) positions of points and the distances and angles between them. These points are used to establish maps and boundaries for a wide variety of purposes including land ownership, locations, such as building corners or the surface location of subsurface features, or other purposes required by government or civil law, such as property sales. Surveyors presently work with survey systems that may include a GNSS (Global Navigation Satellite System) receiver and a data collector mounted upon a survey pole or rod to perform data collection at a site or "in the field."

GNSS is a satellite system that is used to pinpoint the geographic location of a user's receiver anywhere in the world. Two GNSS systems are currently in operation: the United States' Global Positioning System (GPS) and the Russian Federation's Global Orbiting Navigation Satellite System (GLONASS). GNSS surveys use the signals transmitted by satellites with trajectories such that any point on the Earth's surface can be determined around the clock and independent of weather conditions. The positioning accuracy depends on the type of GNSS receiver and on the observation and processing techniques used. Many GNSS systems today enable a diverse range of survey tasks with user-guided onboard applications (e.g., surveying or control software running on the data collector) to be carried out with centimeter accuracy in real-time kinematic (RTK) or post data collection processing.

The positioning accuracy or precision of the data collected by the survey system can also be effected mechanical parameters or aspects of the system and its assembly. The GNSS receiver or top unit of a survey system is generally mechanically coupled to or mounted on a top end (i.e., end opposite the tip that is inserted into or placed on the ground), and this mounting may be achieved in a number of ways including a threaded connect, a mechanical quick disconnect, or the like. The mounting hardware or its use may cause there to be a mechanical misalignment between the GNSS receiver and the survey pole such that the GNSS receiver (or one or more of its components such as its antenna patch) is not plumb or orthogonal with the pole's longitudinal axis (or simply "pole axis"). For example, mechanical tolerances in the manufacture of a quick disconnect, in the threads on threaded connections of the receiver and pole top, and so on may cause a relatively small mechanical misalignment that can significantly affect the precision of data collected with the survey system. In other cases, the pole may be bent or become bent in the field, and this may cause the survey system to become misaligned (e.g., make it difficult to determine the tip position with data collected by the GNSS receiver).

These misalignments may cause there to be a non-zero mounting angle (or deflection angle, misalignment angle, misclosure angle, or the like) to exist between the pole axis (proximate to the top of the survey pole) and a center axis of the GNSS receiver (e.g., a line extending orthogonal to the plane containing the receiver's sensor(s)). Presently, if pole is bent or a survey system is misaligned, the surveyor is forced to accept the additional error or to replace the pole or remount the receiver. There remains a need for a method, and survey system adapted to implement such a method, of calibrating a survey system that includes a survey pole and a GNSS receiver, and it is preferable that the surveyor be able to perform or initiate such calibration in the field, such as prior to data collection each day, at each site, when a pole is bent/damaged, or the like.

SUMMARY

Briefly, the inventors designed a survey system that is configured to perform a calibration that eliminates, or at least significantly reduces, mechanical misalignment issues with the receiver or top unit (e.g., a GNSS receiver or the like), the mounting hardware or assembly (e.g., a quick disconnect, a threaded connect, and/or other components), and the survey pole of the survey system. The survey system may further include a data collector mounted upon the pole, and a calibration module (i.e., calibrating software and/or firmware) may be run or provided on the data collector or other component of the survey system (e.g., on the top unit or on a device separate from the survey pole wirelessly in communication with the data collector and/or top unit). The calibration module processes data collected (including data from its inertial measurement unit (IMU)) by the top unit during calibration operations (or simply calibration) to determine a mounting angle and a correction factor (or correction for attitude) based on this mounting angle, and the correction factor is communicated to the top unit for use in later data collection (surveying operations) to improve accuracy of the survey system.

Prior to development of the new survey system, if a pole and/or complete survey system was bent or misaligned, the surveyor had to replace the pole or system or simply accept the additional error introduced by the mechanical misalignment. The calibration module, and calibration method implemented during use of a survey system with such a calibration module, makes pole tip positioning with an IMU-enabled receiver or top unit more accurate. The calibration module uses GNSS positions (e.g., provided from a Titan engine in some exemplary but non-limiting examples) and raw IMU values from the top unit that are combined with a specific field procedure to estimate deflection and/or misalignment or mounting angles.

The field procedure includes having the surveyor or system operator take two (or more) observations with the survey system. A first observation is taken with the GNSS receiver facing a first direction (or with its front surface or side facing this first direction) and with the survey pole typically oriented vertically with its pole tip in a tip position or location. The field procedure than continues with taking a second (or more) observation with the GNSS receiver facing a second direction (or with its front surface or side facing this second direction) obtained by rotating the survey pole, without moving the pole tip from the tip position used during the first observation (data or sample collection), through a rotation angle (e.g., about 180 degrees or other useful rotation angle). If there is an alignment issue or a bent pole, the measurements for the position/location of the pole tip do not fall on the same point. The two sets of samples or collected receiver data is processed to determine the mounting angle and the correction for attitude of the GNSS receiver, and, in general, the locations or measured points of the pole tip are used in relation to one another to estimate the mounting (or deflection or misalignment) angle.

More particularly, a survey system is provided that is specially adapted for field calibration. The system includes a survey pole extending linearly from a tip to a top end and also includes a Global Navigation Satellite System (GNSS) receiver and mounting hardware attaching the GNSS receiver to the top end of the survey pole. The system further includes a calibration module processing first and second sets of data collected by the GNSS receiver with the GNSS receiver facing a first direction and a second direction, respectively. The second direction differs from the first direction (such as by 180 degrees or some other rotation angle), and data collection is performed with the tip of the survey pole at a control point. The calibration module processes the two sets of collected data from the GNSS receiver to calculate a correction or calibration factor to apply to measurements of the GNSS receiver to determine, with calibration to account for a bend in the survey pole or misalignments caused by use of the mounting hardware, a position of the tip of the survey pole.

In some embodiments, the correction includes correction values for pitch, roll, and yaw of the GNSS receiver. In these and other embodiments, the processing of the first and second sets of data may include determining a mounting angle between a pole axis and a vector orthogonal to an attitude of the GNSS sensor. Also, the processing of the first and second sets of data may include calculating first and second positions of the tip of the survey pole when the GNSS receiver is positioned to face the first and second directions, respectively, and calculating the correction to obtain a true position of the tip of the survey pole based on the first and second positions of the tip of the survey pole.

In some preferred embodiments, the GNSS receiver includes an embedded inertial measurement unit (IMU), and output of the IMU is used to determine when the GNSS receiver is oriented to face in the first and second directions. The second direction may be offset from the first direction by a rotation angle, and the output of the IMU is used to determine when the survey pole (and attached GNSS receiver) has been rotated through the rotation angle. The rotation angle may be, for example, 180 degrees or some other useful amount of rotation. The survey system may include a data collector with a display, and the calibration module may then be adapted to provide a graphical user interface (GUI) with the display showing a present amount the survey pole has been rotated and a present heading for the GNSS receiver. In some implementations, the output of the IMU is used to determine a tilt of the survey pole, and the calibration module updates the GUI to display the determined tilt. Further, the first and second sets of data typically are collected (e.g., the calibration module triggers GNSS receiver observation mode) when the determined tilt is less than about 3 degrees, and the second set of data is collected when the survey pole has been rotated 175 to 185 degrees its location during collection of the first set of data (or in a 10-degree window about the predefined rotation angle).

The survey system may be configured such that, during the collection of the first and second sets of data, the calibration module checks data integrity of measurements by the GNSS receiver by performing at least one of: (a) processing output of the IMU to determine the GNSS receiver is kept at a particular heading during collection of the first and second sets of data; (b) processing output of the IMU to determine the GNSS receiver is kept level during collection of the first and second sets of data; and (c) determining whether GNSS precision values of the GNSS receiver stay within a predefined tolerance.

DETAILED DESCRIPTION

The present description provides improved devices and methods for use providing field calibration of survey systems. The survey systems typically include a survey pole, a top unit (e.g., a receiver such as a GNSS receiver), and mounting hardware coupling the top unit onto a top end of the pole (opposite the pole's tip). A calibration module is provided in the survey system, such as in the top unit or data collector, that calculates a mounting angle to determine whether or not the top unit (or its sensors such as the center of a patch antenna or the like) are plumb or orthogonal with the pole axis due to mechanical tolerances, offsets, or other issues with the mounting hardware or its use in attaching the top unit to the survey pole.

In brief, the calibration method involves a surveyor initiating the calibration module or software. The survey pole is then held in an approximately vertical position. The top unit is then operated to collect a first set of data with the top unit facing a first direction. The pole is rotated through a rotation angle (such as one in a window of 10 degrees about 180 degrees), and the top unit is then operated to collect a second set of data with the top unit facing a second direction. A smaller rotation angle (such as 45 degrees, 60 degrees, 90 degrees, or the like) may be used and three, four, or more sets of data may be collected for processing by the calibration module in some implementations. The important aspect being that more than two faces of observation be used in the calibration process. The collected data or samples may include a GNSS position as well as IMU sensor data (e.g., roll, pitch, and yaw (or the sensor's attitude)). The calibration module processes, with an algorithm described in detail below, to determine a mounting angle and, based on this calculated mounting angle, a correction for attitude or correction factor that is issued by the top unit in future data collection to calibrate the survey system. In this way, the survey system is configured to use IMU data to determine the correct pole tip position for the survey system despite misalignments caused by the coupling of the top unit to the pole or by bending of the pole.

Figure 1:
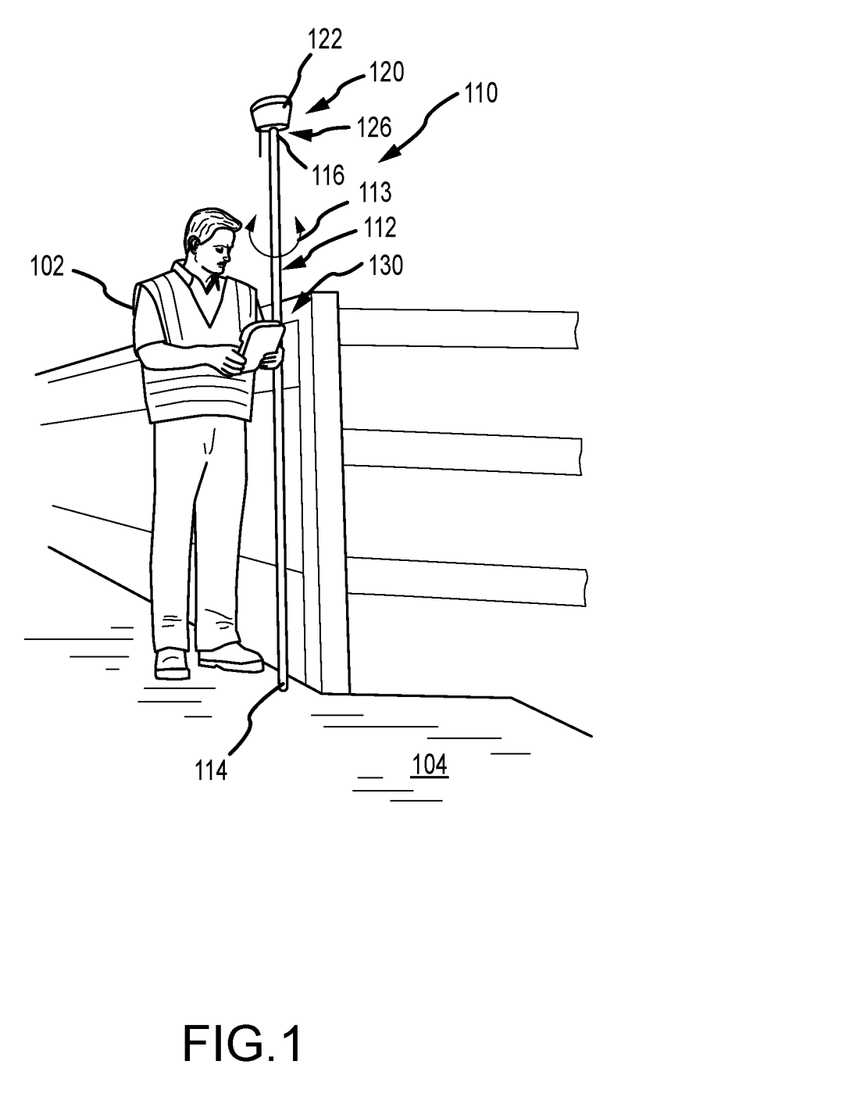
FIG. 1 illustrates a survey system of the present description during field calibration.

FIG. 1 illustrates a surveyor 102 operating a survey system 110 to perform field calibrations prior to surveying a physical site. As shown, the survey system 100 includes a survey pole 112 that extends from a pole tip 114 to a top end 116, and pole 112 is preferably perfectly straight to extend along a longitudinal axis or "pole axis" (but the calibration method described herein corrects for the pole becoming bent). The survey system 110 further includes a top unit or receiver 120, which may take the form of a GNSS or other similar receiver, that is connected by mounting hardware 126 to the top or upper end 116 of the survey pole 112. The top unit 120 includes a processor(s), memory/data storage, and an IMU (e.g., is IMU-enabled), and it is operable to collect data or samples (e.g., observations) with it front side or surface 122 facing a particular direction. The system 110 also includes a data collector 130 mounted on the pole 112, such as at an adjustable height for easy use by the surveyor 102, that may be a rugged computer with a keyboard, a touchpad/screen, and a display screen for providing a surveying graphical user interface (GUI) that may be generated, in part, by the calibration module to provide a calibration GUI when the calibration module is initiated/run as an initial step in surveying or use of the system 110.

As discussed below, the survey system 110 further includes a calibration module (e.g., software/firmware) run by a processor on the data collector 130 (or on the top unit 120 or another system component communicating with the data collector 130 in other embodiments). During calibration, the surveyor 102 positions the survey system 110 as shown in a first state with the pole tip 114 on/in the ground 104 and pole 112 vertical or substantially so (with 2 to 3 degrees of vertical with some preferred embodiments within 1 degree of vertical as measured by the IMU and indicated on the calibration GUI on the data collector 102 during calibration) and with the front side/surface 122 of the top unit/GNSS receiver 120 facing a first direction. The data collector 130 triggers operations of the top unit 120 to collect data (e.g., a predefined number of samples), and this collected data is provided to the data collector 130 (e.g., stored in its memory). The surveyor 102 is then prompted via the GUI on the data collector 130 to rotate as shown with arrows 113 the pole 112 through a predefined rotation angle, such as 180 degrees.

The IMU in the top unit 120 acts to sense when this rotation is completed, and the calibration module may automatically cause the data collector 130 to trigger operations of the top unit 120 to collect data (e.g., a predefined number of samples) with the front surface/side 122 facing this second direction or the GUI on the data collector 130 may provide an indication that the rotation 113 has fallen within an acceptable window (+/−5 degrees or the like) about the predefined rotation angle and prompt the surveyor 102 to initiate the second data collection. Again, this data is passed to the data collector 130 (e.g., stored in memory). The calibration module then processes the two sets of collected data to determine a mounting or misalignment angle, and, based on this calculated angle, a correction for the misalignment or a correction factor. The correction is communicated to the top unit 120, which is adapted to use this correction in later data collection so that misalignment issues are eliminated or at least usefully reduced.

Figure 2:
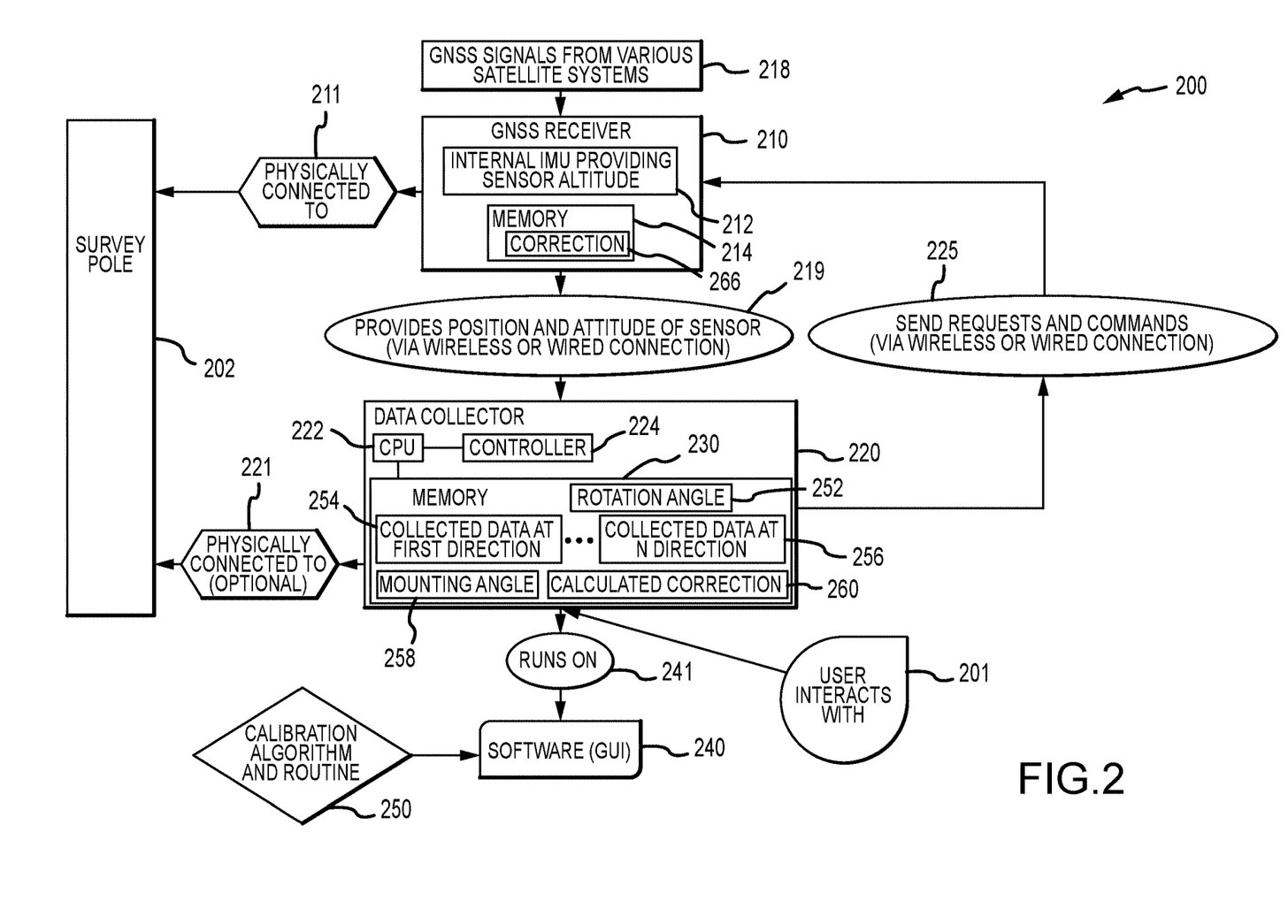
FIG. 2 illustrates a functional block diagram of a survey system of the present description adapted for calibration to correct for misalignments between the GNSS receiver, the mounting hardware, and the survey pole and for a bent pole.

FIG. 2 illustrates a functional block diagram of a survey system 200 adapted for calibration to correct for misalignments between the GNSS receiver, the mounting hardware, and the survey pole and for a bent pole. As shown, the survey system 200 includes a survey pole 202, a GNSS receiver 210 (e.g., a GNSS receiver available from Trimble or the like), and a data collector (e.g., the TSC7 available from Trimble or the like). The GNSS receiver 210 is physically attached to the top end of the pole 202 as shown at 211 with mounting hardware such as a quick disconnect, and this connection (or a bent pole 202) may cause the determination of the location of the tip of the pole 202 to be less accurate. The data collector 220 is also physically attached to the survey pole 202 so that it can be operated by a user/surveyor as shown at 201. The GNSS receiver 210 is adapted, such as with a patch antenna, for receiving GNSS signals from various satellite systems as shown at 218, and the receiver 210 is further IMU-enabled as it includes an IMU 212 operable to provide sensor attitude during system 200 operations as shown at 219 to the data collector 220. The GNSS receiver 210 also includes memory/data storage 214 that is used to store a calibration factor or correction 266.

The data collector 220 includes a processor(s) 222 that runs software/firmware (e.g., executes code provided in local memory) to provide the functions of a controller/control module 224 including sending requests and commands (via wireless or wired connection) as shown at 225 to the GNSS receiver 210. These requests/commands 225 may include instructions for the GNSS receiver 210 to collect data or samples when oriented to be at the first, second, or more directions for calibration. The data collector runs, as shown at 241, software 240 that provides a GUI on the data collector's display screen (and that allows user input such as initiation of data collection during calibration as shown at 201). The software 240 also includes the calibration module (e.g., one or more algorithms or routines as discussed below) 250.

The data collector 220 includes memory 230 managed by the processor 222 that stores the rotation angle 230 set for the calibration algorithm 250, and this may be 180 degrees when two phases are used or some smaller angle when three, four, or more data collection operations are utilized in the calibration. The memory 230 also is used to store (at least temporarily) data collected when the GNSS receiver 210 is facing a first direction 254 and when in each additional direction 256 as determined by the rotation angle 252. The calibration algorithm and routine (or module) 250 functions to process the collected data 254, 256 to calculate a mounting or misalignment angle 258 and then to use this angle 258 to determine or generate a correction or calibration factor 260. The correction 260 is then communicated by the data collector 220 to the GNSS receiver 210 for storage in memory 214 as shown at 266 for use in correcting/calibrating future measurements based on the received GNSS signals 258.

At this point in the description, it may be useful to discuss in further detail the problem(s) being addressed and specifics of the calibration method (steps performed by the calibration software 250 during operations of the system 200). When using an IMU in a GNSS receiver for precise attitude (i.e., roll, pitch, and yaw), the survey system is able to derive a precise position of the pole tip. However, there is a fundamental limitation because the IMUs orientation has to be known with respect to the surveyor's pole. This cannot be easily determined, though, in standard manufacturing calibration as it would be very costly and unrealistic as it would require one to have the specific surveyor's pole and receiver at the time of manufacture.

Figure 3:
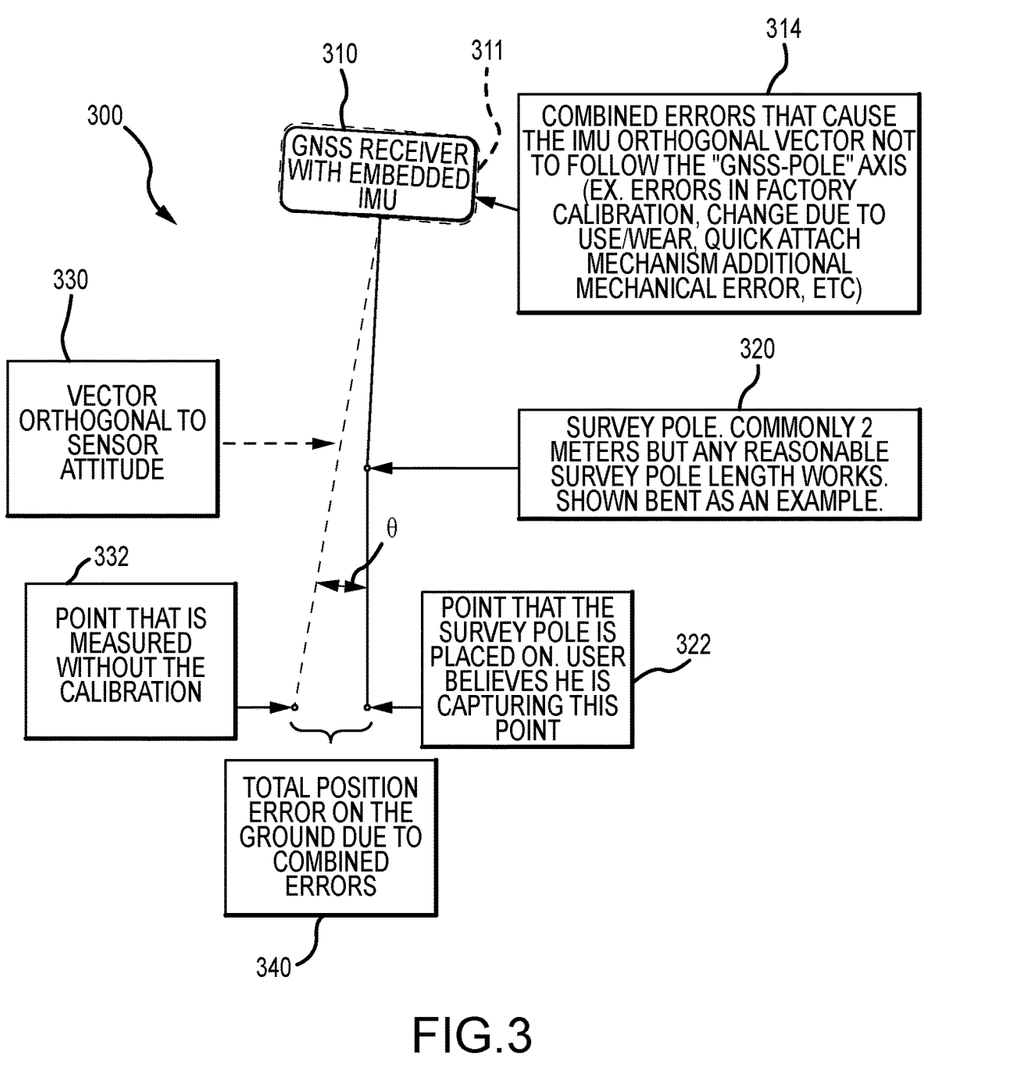
FIG. 3 is a diagram showing survey system and diagrammatically issues producing errors in pole tip position calculations without calibration.

In the marketplace today, the GNSS receiver along with its internal IMU sensor are calibrated alone and then it is assumed that the survey pole is perfect as is the mechanical coupling between the survey pole and the GNSS receiver. FIG. 3 is a diagram showing survey system 300 and diagrammatically issues producing errors in pole tip position calculations without calibration (as taught herein). The system 300 includes a GNSS receiver 310, 311 and a survey pole 320. The GNSS receiver is to include an embedded IMU and is shown in solid lines at 310 to shown the factory calibrated location of the GNSS receiver and at 311 in dashed lines to show the true attitude of the receiver when mounted on the top of the pole 320.

The diagram of FIG. 3 is useful for showing there are a number of issues with calibrating a receiver alone and then assuming the pole 320 is straight. At 314, it is noted that combined errors can cause the IMU orthogonal vector 330 to not follow the "GNSS-pole" axis (generally an axis following the pole 320 if it were not bent). These errors may include errors in factory calibration, changes due to use and/or wear, quick attach/disconnect mechanism tolerances, additional mechanical errors, and so on, and these errors generate a misalignment or mounting angle, θ. In FIG. 3, the survey pole 320, which may be 2 meters or the like, is shown to be bent as one example of another issue that may create a non-zero mounting angle, θ. At 322, the pole tip is shown at a point where the survey pole is place on by a user/surveyor. The user of the system 300 believes they are capturing the location of this point when they operate the GNSS receiver 310, 311. However, as shown, the true vector 330 that is orthogonal to the sensor attitude (or to a plane containing the GNSS sensor(s)) results in capturing the location of point 332 (without calibration as taught herein) that is offset a distance or total position error 340 on the ground due to the combined errors/misalignments. As shown, these additional error sources can have a compounding effect. Currently, in the marketplace, these errors have to be accepted by users of the system 300 and attempts to minimize them are made by replacing survey poles when bent or damaged and trying to be gentle with the equipment.

Figure 4:
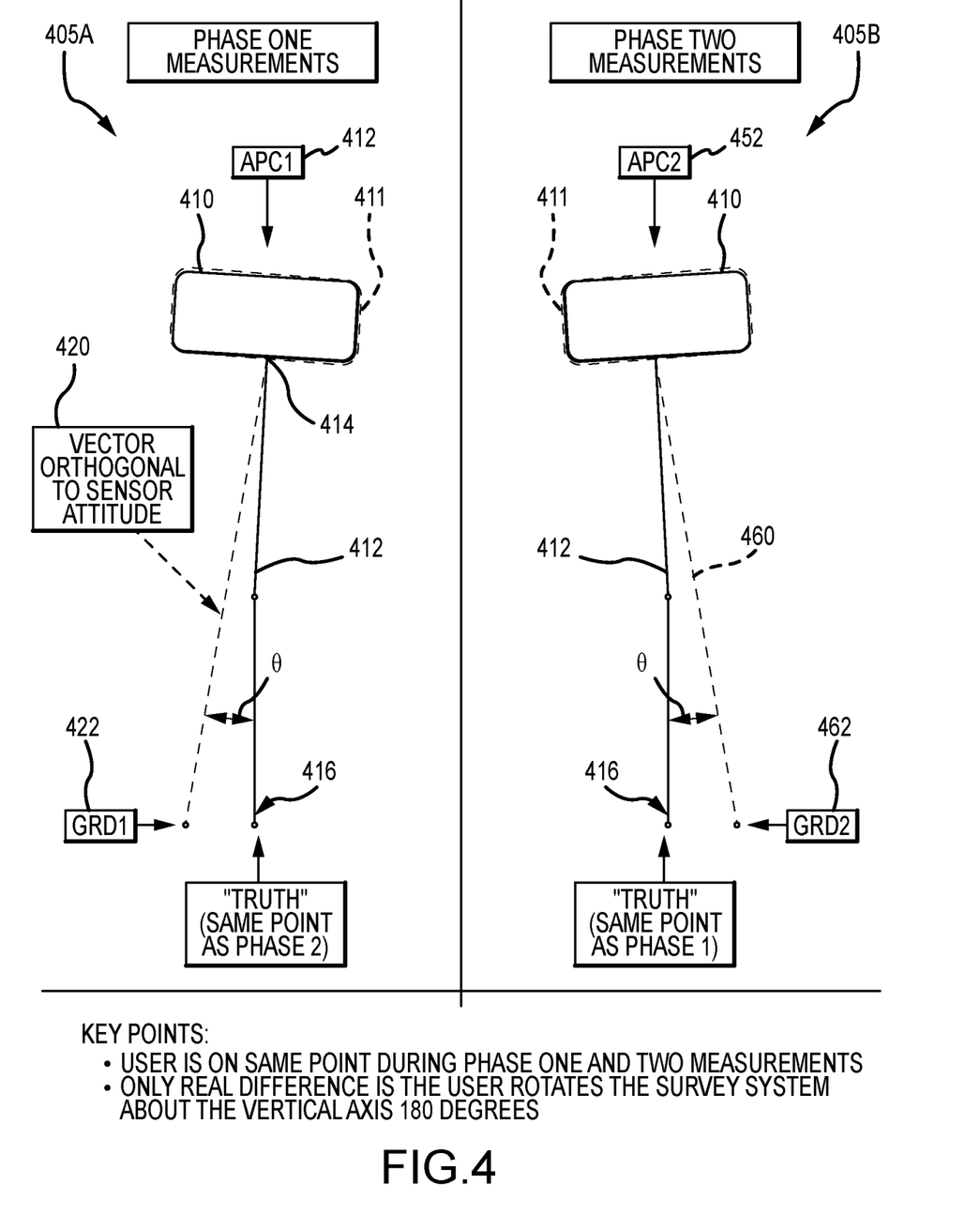
FIG. 4 illustrates operation of a survey system during calibration processes.

FIG. 4 illustrates a survey system during a first phase or step of data collection (or measurements) at 405A and at a second phase or step of data collection (or measurements) at 405B. The system 405A, 405B includes a receiver or top unit 410 that is IMU-enabled and that is potentially misaligned as shown at 411 with the axis of the pole 412 (due to a bend in the pole 412 itself and/or due to issues with the mounting hardware used to mount the top unit 410 to the top or upper end 414 of the pole 412. As shown, the pole tip 416 is placed by a user (not shown) on the same point during phase one 405A and during phase two 405B (labeled with a box indicating this is the "Truth" or true tip location during calibration).

Due to the misalignment or a bend in the pole 412, the receiver 410 receives and processes sensor (e.g., GPS satellite data) 412 and 452 during each phase that results in two different calculated pole tip positions (or ground points labeled GRD1 and GRD2 in FIG. 4). A vector 420 and 460 orthogonal to the sensor attitude provides these two measured tip positions 422, 462, and these vectors 420, 460 are offset from the pole axis (or an axis extending from the sensor attitude along the pole 412 at the top end 414 so before any bend) by a mounting or misalignment angle, θ. The only real difference between data measurements during phase one with the system 405A and during phase two with the system 405B is that the user has rotated the survey system about the vertical axis through a rotation angle of 180 degrees.

Figure 5:
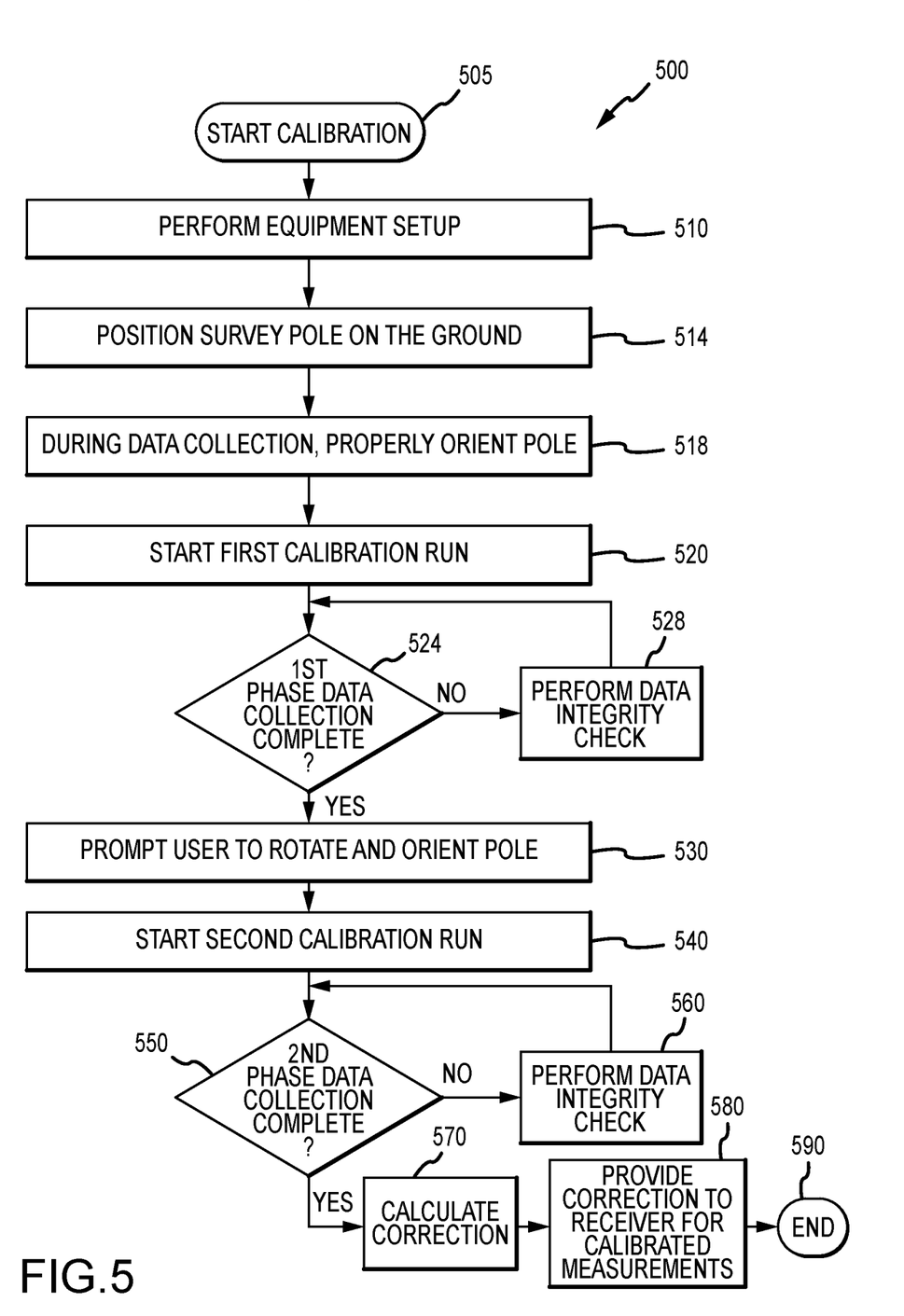
FIG. 5 is a flow diagram of a field calibration method of the present description for a survey system.

FIG. 5 provides a flow diagram of field calibration method 500 that may be carried out for a survey system using a calibration module/software of the present description. Field calibration 500 starts at 505 such as with the selection of equipment to include in the survey system such as the survey pole to be used, the particular GNSS receiver, a data collector, and mounting hardware for mounting the receiver onto the survey pole. The method 500 continues at 510 with equipment setup. This may include downloading calibration software to the GNSS receiver or data collector (if not already performed). The GNSS receiver is attached to the survey pole to be calibrated such as by screwing the receiver onto the pole directly or with a quick release mechanism or other mounting hardware. The data collector may be connected to the GNSS receiver (e.g., via a cable, Bluetooth, or other communication means). The GNSS receiver and data collector are powered on in step 510, and then the calibration module may be run or initiated, and a rod length (1.5 to 2.5 meters is common for a survey pole) is entered for use by the calibration method in generating a correction.

Data used in the field calibration can now be collected. At step 514, the survey pole is positioned by the user on the ground (a GUI may be provided on the data collector via the calibration module's operations, and this GUI may prompt the user to position and orient the pole). In step 514, the pole's tip is placed at a point on the ground, and the point does not need to be a known control point (e.g., a previously measured point) as the pole tip can be place on any reasonable solid surface (reduced accuracy in some cases if placed on sand, mud, and the like), hardscape (e.g., asphalt, concrete, or the like), or firm natural scrape (grass, dirt, and so on). During data collection steps, the user preferably holds or orients the pole in a desired manner. Particularly, the user may be prompted (via the GUI or other communication processes) to hold the survey system (i.e., the GNSS receiver mounted onto a survey pole plus a data collector) roughly level and roughly stationary. The calibration does work when the system is continuously or periodically moving or while in a fixture that allows no movement. However, handheld calibration is allowed for user convenience. The pole is kept vertical (or less than 3 degrees off of vertical) to keep the sensor level or orthogonal to the pole axis to achieve better results, but calibration will work at up to a 45 degree offset of the pole axis from vertical.

The method 500 continues at 520 with starting a first calibration run. For example, using the calibration GUI, the user may start calibration. The calibration module/software takes this input, and, in response, it causes the data collector (when the software/module is on the data collector and not on the GNSS receiver as it is in some cases) to send commands to the GNSS receiver to change the GNSS receiver into a measurement mode. During the measurement phase (step 520 in FIG. 5), GNSS and IMU data is being collected by a GNSS chip/sensor(s) and an embedded IMU and stored in memory in this top unit/receiver. The information that is used for calibration includes the antenna phase center position and the error estimates associated with these positions. At the same time (or concurrently), the IMU data is being collected. The information that is used for calibration from the IMU is the attitude of the sensor (roll, pitch, and yaw) and the error estimates. There are different methods to combine the raw GNSS and IMU data into a single solution, and the calibration 500 is not dependent on any one method. The results (position and attitude of the sensor), instead, are all that is used by the calibration module to complete calibration.

The method 500 includes determining whether first phase data collection is complete at 524. Data collection can involve a variety of sample quantities to provide useful calibration. One embodiment includes collecting a relatively large number of samples such as 50 to 150 or up to 1000 or more (with one prototype using 100 samples collected at 1 to 10 Hz (as this took minimal time for the user) or other useful speed or time between consecutive samples) while other implementations may use a much smaller number of samples such as 1 to 10. If more samples are needed, the method 500 continues back to step 524 until the first phase of measurements are completed. As shown at 528, during the sampling, phase data integrity checks are done in real time to ensure that the data being captured is reliable. One exemplary data check that may be performed at 528 involves deriving estimated precisions (as is well known in the industry for GNSS/INS systems).

At step 530 (after the first phase of data collection is complete), the method 500 includes prompting the user to rotate and orient the pole for second phase data collection. The prompting may be done in the GUI provided in the data collector display, and it may remind the user to not move the pole tip from the point it was at during the first calibration run at 520. The rotation angle may also be displayed to the user, and, if only two calibration runs or data collection phase are used, the rotation angle will be 180 degrees. The IMU data may be used to determine when the user has completed the rotation, and the amount of rotation may be determined and displayed to the user in the GUI of the data collector during rotation to facilitate the user accurately rotating the pole the rotation angle (or within a 10 degree window about 180 degrees or another rotation angle). Further, the IMU may be used to sense and/or measure whether or not the user is orienting the pole vertically (or within 3 degrees of vertical in some preferred cases). Other rotation angles may be used with 180 degrees being used as it makes the math performed by the calibration module much more straightforward (and, hence, less processing intensive and/or time consuming). However, those skilled in the arts will understand that rotation angles of 45, 60, 90, 270, or the like may also be used. Two measurements are used in method 500 as it is the easiest for the user, but it is understood that adding more measurement phases to the method 500 may be useful in some cases and considered part of this disclosure.

At 540, the second calibration run is begun and its processes are identical to the first calibration run but with the GNSS receiver/top unit facing a second direction. At 550, the method 500 includes determining whether all samples have been collected (such as 100 samples in some embodiments), and, if not, the method 500 continues at 560 with performing data integrity checks and then/concurrently collecting more samples with the GNSS receiver. Once all samples are collected, the method 500 continues at 570 with the calibration module running an algorithm (discussed in detail below) to calculate a correction or calibration factor. Then, at step 580, the correction is communicated to the GNSS receiver where it is stored in memory and then used for later data collections to provide calibrated measurements. The method 500 then ends at 590, and it does not need to be repeated until there is a change in hardware (e.g., a new pole) or damage or wear/tear to the hardware (e.g., pole is bent in the field), but it may be desirable for the calibration to performed periodically such as once a day or after a move to a new site.

The following provides specifics on how the algorithm computes the correction in one embodiment of a calibration module/routine (or how step 570 is completed in a survey system during field calibration). The algorithm starts by reducing each phase of measurements. This can be done as an average, median, or with another approach. At the end, the algorithm (or calibration software) should have a single antenna phase center (APC) position and attitude for each phase of the calibration. Note, one can elect to use the reduction of the inputs as mentioned here or one can compute a correction for each sample (however many are done) and reduce the output as either approach works well.

Next, the algorithm continues with computing the projected pole tip position using the APC position, attitude, and pole length as per:

$$\text{tip\_e} = \text{apc\_e} + Cge * Cbg * [0,0,L]$$

where L is the distance from APC to survey pole tip $$Cge = [-\sin(\phi)\cos(\lambda) - \sin(\lambda) - \cos(\phi)\cos(\lambda); -\sin(\phi)\sin(\lambda)\cos(\lambda) - \cos(\phi)\sin(\lambda)\sin(\lambda); co(\phi)0 - \sin(\phi)]$$

and $Cbg = [\cos(\alpha ab,3)\cos(\alpha ab,2)\cos(\alpha ab,3)\sin(\alpha ab,1)\sin(\alpha ab,2)\cos(\alpha ab,1)\sin(\alpha ab,3)\sin(\alpha ab,1)\sin(\alpha ab,3) + \cos(\alpha ab,1)\cos(\alpha ab,3)\sin(\alpha ab,2); \cos(\alpha ab,2)\sin(\alpha ab,3)\cos(\alpha ab,1)\cos(\alpha ab,3) + \sin(\alpha ab,1)\sin(\alpha ab,3)\sin(\alpha ab,2)\cos(\alpha ab,1)\sin(\alpha ab,3)\sin(\alpha ab,2) - \cos(\alpha ab,3)\sin(\alpha ab,1); -\sin(\alpha ab,2)\cos(\alpha ab,2)\sin(\alpha ab,1)\cos(\alpha ab,1)\cos(\alpha ab,2)]$ with αab 1, 2 and 3 as roll, pitch, and yaw (in this order) and where φ is a latitude and is a longitude in the WGS84 frame.

Now, the algorithm has reduced four positions and has two APC positions (one for each phase of measurements), which may be called APC1 and APC2. The algorithm also has two reduced ground or projected points, which may be called GRD1 and GRD2.

One element to this calibration method that helps in performing the calibration algorithm is the known constraint that the pole tip of the survey system never moved (between the different calibration phases or runs). Knowing that the pole tip was not moved and that we have measurement phases that are 180 degrees apart (or another rotation angle in some cases), the known geometry can be used in the algorithm to infer that a single set of correction angles if applied to the attitude of the sensor will remove the error. The middle point of GRD1 and GRD2 is essentially the point we want to have computed, and this point may be called "Truth" (see FIG. 4, for example). This known mechanical nature and its geometry is the significant to the calibration algorithm or method.

Computing the correction or mounting angles can be done several ways to implement the calibration algorithm. The following is one useful, but non-limiting, example technique: (a) compute the midpoint of GRD1 and GRD2; (b) shift the measurements to be ECEF deltas from Truth; (c) rotate the deltas to dEast, dNorth, and dUp; (d) calculate the average horizontal angles to the observations; (e) rotate the azimuth by the yaw to get the heading relative to the receiver; (f) calculate the forward and sideways error distances; and (g) convert to alignment angle errors using antenna height. Another potentially useful way to compute the angles is a brute force iterative search of all possible correction angles. Having computed the correction angles to roll, pitch, and yaw, the correction or correction angles can be applied to future measurements of the system (e.g., by storing the correction in the GNSS receiver). Use of the correction (or set of correction angles) will largely reduce the errors from sources such as: mechanical tolerances; IMU sensor calibration limitations; "bent" survey pole; or anything that would cause the pole tip of the survey system to be on a known orthogonal axis relative to the IMU in the GNSS receiver.

In some of the above examples of the calibration method, a second set of samples or observations are collected by the GNSS receiver after the user rotates the pole (without moving the tip from the original point on the ground or "Truth") through a rotation angle of 180 degrees such that the GNSS receiver's front side or surface is facing in an second direction that is opposite the first direction. Accuracy is maintained, though, with the algorithm as long as the rotation is within a window about 180 degrees such as a 10 degree window corresponding to rotation of the pole through 175 to 185 degrees by the user. In some embodiments, the IMU is operated to sense the rotation of the pole, and its output is used by the calibration GUI is updated on the data collector to provide the user feedback showing the actual rotation in real time so that they can accurately rotate the pole into the above-discussed window (e.g., typically within 1 degree of 180 degrees).

In some embodiments, the second set of samples or observations for calibration are collected automatically upon the calibration software detecting the pole has been rotated 180 degrees (or into the 10 degree window). In other embodiments, the GUI is updated to show rotation amount that is sensed via the IMU, and the user is prompted (e.g., with a button in the GUI) to initiate or trigger collection of the second set of samples/observations by the GNSS receiver. In other words, the IMU is used by the new calibration module to provide feedback to the survey system user to ensure calibration is properly performed. Two sets of samples may be collected to achieve good results, but it may be useful to use more than two faces of observation, with the rotation angle differing from 180 degrees such as 30, 45, 60, 90, 120, or other useful amount of rotation and with three, four, five, six, or more faces of observation being used in these other embodiments.

The above discussion also indicated that the pole may be oriented in a vertical arrangement, and the IMU may again be used by the calibration module to determine whether or not the pole is vertical. Testing has shown that good results are achieved when the pole is held within 3 degrees of vertical with some implementations providing IMU-based feedback to the user in the calibration GUI on the data collector indicating when sensors (or a plane containing the sensors in the receiver) are held within 1 degree of horizontal. In other embodiments, though, the calibration algorithm is configured to allow tilting of the pole during data collection such as up to 45 degrees tilting that would also result in the receiver to be up to 45 degrees from horizontal.

The number of samples collected at each face of observation (e.g., orientation of the GNSS receiver) may range widely to practice the calibration method, e.g., 1 to 1000 or more. For each data collection phase, the sensor data may be averaged or otherwise combined to obtain a single pole tip position and corresponding mounting or misalignment angle. Also, as discussed with reference to FIG. 5, the collected data is checked as it is being collected (in most embodiments but could be a post-data collection verification) to verify that the data is good data (e.g., data with an acceptable level of precision to be used in calibration), and, when the data collected is not verified, the user may be prompted to repeat the entire calibration process or one or more data collection phases to obtain "good" data at each face of observation.

In some implementations, the calibration module and/or its algorithm are labeled a "plumb pole routine" or PPR. The PPR is used to correct for a pole that may have become bent and is no longer completely plumb or straight (or to correct for misalignment due to the receiver mounting hardware as discussed above). Regarding the PPR workflow, a first step may be, in an area of good open sky coverage for satellites, to ensure the receiver is aligned and the pole tip is on a control point (a point on firm ground, for example, from which it will not be moved during the PPR/calibration). The PPR takes one set of measurements while facing one direction and then a second set of measurements after rotating the receiver 180 degrees (for example). The PPR then corrects the receiver for any bends in the survey rod (or due to misalignment due to mounting hardware) based on these measurements.

In one survey system implementation or design, the PPR is accessed by a user by clicking on a GNSS precision icon (or calibration icon) to enter a screen or GUI on the display of the data collector to allow viewing of a PPR button that can be selected to enter the PPR's workflow (or to initiate the calibration module as discussed above). In a PPR home screen, a start button may be provided for the user to select along with a set of instructions or prompts for the user including: hold rod/pole approximately vertical, do not shift pole tip when rotating, and tap start to begin PPR/calibration. Also, the PPR home screen may provide initial sensed measurements such as a heading, a pitch, a roll, and a tilt.

When the start button is pressed/selected by the user, a first data collect or phase of the PPR begins. The user is instructed (via a first phase GUI screen or otherwise) to keep the pole vertical and stationary and to keep the pole tip in the same location while the measurements are recorded by the GNSS receiver. The PPR/calibration module may update the first phase GUI screen to show percentage of completion of the phase one data collection and to provide measured (e.g., via the IMU in the receiver) values for heading, pitch, roll, and tilt/yaw. Also, the GUI may include visual feedback as to whether or not the GNSS receiver is oriented to face the direction/heading at which the first phase was initiated. For example, the GNSS receiver may be allowed to be rotated within a 10 degree window of the first direction/heading, and an icon or graphic display element (such as a circle with a centrally located arrow head representing the receiver and a direction it is facing) is provided to indicate to the user a current heading of the receiver with an overlay of the acceptable rotation window (with it being a preferred goal for the user to hold the arrow head in the center of this window for better results while performing phase one sampling).

During the calibration routine, values are continuously or at least periodically checked to ensure accurate measurements. If the values go out of a predefined tolerance, the measurements will be stopped by the calibration module and a warning message may be displayed to the user in the first phase GUI screen on the display of the data collector. Some of the checks that may be performed include: (a) the receiver is kept at the same rotation/heading; (b) the receiver is kept roughly level; (c) the receiver remains aligned; and (d) the GNSS precision values of the receiver stay in a predefined tolerance (e.g., 0.021 m horizontal, 0.030 m vertical, and/or the like). The data collection may restart automatically once a user corrects any of the above issues or the user may be prompted to select a restart button after they have corrected the issue causing the imprecision in the collected data (e.g., after reorienting the pole to remove excess tilt or rotation).

When phase one of data collection for calibration is complete, the user is prompted to rotate the pole and attached receiver a rotation angle (e.g., 180 degrees) to cause the receiver to face a second direction (or have a second heading) that is opposite the first direction. In some cases, the GUI screen on the data collector is updated to provide the rotation angle along with a graphical display element that shows current heading of the receiver and shows a window in the circular element where the arrow head representing the receiver should be positioned by the rotation. The currently measured (by the IMU) heading, pitch, roll, and tilt may also be displayed to the user in the GUI screen. Once the rotation is completed and the IMU senses that the receiver is facing the desired second direction (or has the desired second heading 180 degrees apart from the first), the GUI screen may be updated by the calibration module/PPR software to include a second phase data collection start button that can be selected by the user. In some case, this start button is not displayed until the receiver is also held approximately horizontal (e.g., by holding the pole substantially vertical). After the start button is selected, the second phase data collection is carried out by the GNSS receiver in the same manner as discussed for the first phase (including data integrity checks).

At the end of the second phase data collection, the PPR/calibration module acts to determine correction values, and these values may be displayed to the user in the GUI screen of the data collector (e.g. a pitch correction value, a roll correction, and a tilt/yaw correction may be displayed). These values may be communicated to the GNSS receiver to calibrate the later collected measurements, and, in some cases, the user is provided the option of applying the new values (such as when the values are above 5 mm/0.02 ft when using a 2 m/6.562 ft long survey pole or the like). An accuracy check may be performed after applying the corrections to the receiver by rerunning the PPR, as this should result in no or minimal correction values being calculated by the PPR when the receiver is applying the previously calculated calibration factors or corrections.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

I claim:

1. A survey system adapted for field calibration, comprising:
   a survey pole extending linearly from a tip to a top end;
   a Global Navigation Satellite System (GNSS) receiver;
   mounting hardware attaching the GNSS receiver to the top end of the survey pole; and
   a calibration module processing first and second sets of data collected by the GNSS receiver with the GNSS receiver facing a first direction and a second direction, differing from the first direction, and with the tip of the survey pole at a point on a surface to calculate a correction to apply to measurements of the GNSS receiver when determining, with calibration to account for a bend in the survey pole or misalignments caused by use of the mounting hardware, a position of the tip of the survey pole,
   wherein the GNSS receiver comprises an embedded inertial measurement unit (IMU),
   wherein output of the IMU is used to determine when the GNSS receiver is oriented to face in the first and second directions, and
   wherein the processing of the first and second sets of data includes calculating first and second positions of the tip of the survey pole when the GNSS receiver is positioned to face the first and second directions, respectively, and calculating the correction to obtain a true position of the tip of the survey pole based on the first and second positions of the tip of the survey pole.

2. The survey system of claim 1, wherein the correction includes correction values for pitch, roll, and yaw of the GNSS receiver.

3. The survey system of claim 1, wherein the processing of the first and second sets of data includes determining a mounting angle between a pole axis and a vector orthogonal to an attitude of the GNSS sensor.

4. The survey system of claim 1, wherein the second direction is offset from the first direction by a rotation angle, and wherein the output of the IMU is used to determine when the survey pole has been rotated through the rotation angle.

5. The survey system of claim 4, wherein the rotation angle is 180 degrees, wherein the survey system includes a data collector with a display, and wherein the calibration module provides a graphical user interface (GUI) with the display showing a present amount the survey pole has been rotated and a present heading for the GNSS receiver.

6. The survey system of claim 5, wherein the output of the IMU is used to determine a tilt of the survey pole, wherein the calibration module updates the GUI to display the determined tilt, and wherein the first and second sets of data are collected when the determined tilt is less than about 3 degrees and the second set of data is collected when the survey pole has been rotated 175 to 185 degrees its location during collection of the first set of data.

7. The survey system of claim 1, wherein, during the collection of the first and second sets of data, the calibration module checks data integrity of measurements by the GNSS receiver by performing at least one of: (a) processing output of the IMU to determine the GNSS receiver is kept at a particular heading during collection of the first and second sets of data; (b) processing output of the IMU to determine the GNSS receiver is kept level during collection of the first and second sets of data; and (c) determining whether GNSS precision values of the GNSS receiver stay within a predefined tolerance.

8. A field calibration method for a survey system including a survey pole, a GNSS receiver with an IMU mounted to the survey pole, and a data collector, comprising:
   receiving a first set of measurements collected by the GNSS receiver while facing a first direction and with a tip of the survey pole at a user-selected location;
   receiving a second set of measurements collected by the GNSS receiver while facing a second direction offset from the first direction by a rotation angle and with the tip of the survey pole at the user-selected location; and
with a calibration module, processing the first and second sets of measurements to calculate a set of corrections including at least one of a pitch correction, a roll correction, and a yaw correction,
wherein the first and second sets of measurements include sensor attitude measurements provided by the IMU,
wherein the set of corrections are calculated based on the sensor attitude measurements,
wherein the sensor attitude measurements are used by the calibration module to determine a first position of the tip of the survey pole based on the first set of measurements and a second position of the tip of the survey pole based on the second set of measurements, and
wherein the set of corrections define a true position of the tip of the survey pole during collection of the first and second sets of measurements based on the first and second positions of the tip of the survey pole.

9. The method of claim 8, further including processing output of the IMU to measure rotation of the GNSS receiver and operating a display of the data collector to show the measured rotation of the GNSS receiver to indicate when the survey pole has been rotated through the rotation angle.

10. The method of claim 9, wherein the rotation angle is 180 degrees and wherein the display is operated to display the measured rotation and a graphical display element showing when the measured rotation is within a predefined window about 180 degrees of rotation in which the GNSS receiver can be operated to collect the second set of measurements.

11. The method of claim 9, further including using output of the IMU to update the display of the data collector to show an amount of tilt of the survey pole and wherein the first and second sets of measurements are collected only when the survey pole is tilted less than 3 degrees from vertical.

12. The method of claim 8, wherein the processing of the first and second sets of measurements includes determining first and second mounting angles between an axis of the survey pole and first and second vectors orthogonal to attitude of the GNSS receiver measured by the IMU and wherein the set of corrections correct for a non-zero value of the first and second mounting angles.

13. A system for performing field calibration of a survey system, comprising:
memory storing a first set of samples measured by a GNSS receiver with an embedded IMU while facing a first direction and with a tip of the survey pole at a user-selected location and further storing a second set of samples measured by the GNSS receiver while facing a second direction offset from the first direction by a rotation angle and with the tip of the survey pole at the user-selected location;
a processor managing the memory; and
a calibration module, run by the processor, processing the first and second sets of samples to calculate a set of corrections for use by the GNSS receiver when determining a position of the tip of the survey pole based on later-collected measurements,
wherein the first and second sets of samples include sensor attitude measurements provided by the IMU,
wherein the set of corrections are calculated based on the sensor attitude measurements,
wherein the sensor attitude measurements are used by the calibration module to determine a first position of the tip of the survey pole based on the first set of samples and a second position of the tip of the survey pole based on the second set of samples, and
wherein the set of corrections define a true position of the tip of the survey pole during collection of the first and second sets of samples based on the first and second positions of the tip of the survey pole.

14. The system of claim 13, wherein the calibration module processes output of the IMU to measure rotation of the GNSS receiver and, in response, operates a display to show the measured rotation of the GNSS receiver to indicate when the survey pole has been rotated through the rotation angle.

15. The system of claim 14, wherein the display is operated to display the measured rotation and a graphical display element showing when the measured rotation is within a predefined window about value of the rotation angle in which the GNSS receiver can be operated to collect the second set of samples.

16. The system of claim 14, wherein the calibration module uses output of the IMU to update the display to show an amount of tilt of the survey pole and wherein the first and second sets of samples are collected only when the survey pole is tilted less than 3 degrees from vertical.

17. The system of claim 13, wherein the processing of the first and second sets of samples includes determining first and second mounting angles between an axis of the survey pole and first and second vectors orthogonal to attitude of the GNSS receiver measured by the IMU and wherein the set of corrections correct for a non-zero value of the first and second mounting angles.

18. A survey system adapted for field calibration, comprising:
a survey pole extending linearly from a tip to a top end;
a Global Navigation Satellite System (GNSS) receiver;
mounting hardware attaching the GNSS receiver to the top end of the survey pole; and
a calibration module processing first and second sets of data collected by the GNSS receiver with the GNSS receiver facing a first direction and a second direction, differing from the first direction, and with the tip of the survey pole at a point on a surface to calculate a correction to apply to measurements of the GNSS receiver when determining, with calibration to account for a bend in the survey pole or misalignments caused by use of the mounting hardware, a position of the tip of the survey pole,
wherein the GNSS receiver comprises an embedded inertial measurement unit (IMU),
wherein output of the IMU is used to determine when the GNSS receiver is oriented to face in the first and second directions,
wherein the second direction is offset from the first direction by a rotation angle, and
wherein the output of the IMU is used to determine when the survey pole has been rotated through the rotation angle.

19. The survey system of claim 18, wherein the correction includes correction values for pitch, roll, and yaw of the GNSS receiver.

20. The survey system of claim 18, wherein the processing of the first and second sets of data includes determining a mounting angle between a pole axis and a vector orthogonal to an attitude of the GNSS sensor.

21. The survey system of claim 18, wherein the rotation angle is 180 degrees, wherein the survey system includes a data collector with a display, and wherein the calibration module provides a graphical user interface (GUI) with the display showing a present amount the survey pole has been rotated and a present heading for the GNSS receiver.

22. The survey system of claim 21, wherein the output of the IMU is used to determine a tilt of the survey pole, wherein the calibration module updates the GUI to display the determined tilt, and wherein the first and second sets of data are collected when the determined tilt is less than about 3 degrees and the second set of data is collected when the survey pole has been rotated 175 to 185 degrees its location during collection of the first set of data.

23. The survey system of claim 18, wherein, during the collection of the first and second sets of data, the calibration module checks data integrity of measurements by the GNSS receiver by performing at least one of: (a) processing output of the IMU to determine the GNSS receiver is kept at a particular heading during collection of the first and second sets of data; (b) processing output of the IMU to determine the GNSS receiver is kept level during collection of the first and second sets of data; and (c) determining whether GNSS precision values of the GNSS receiver stay within a predefined tolerance.

24. A field calibration method for a survey system including a survey pole, a GNSS receiver with an IMU mounted to the survey pole, and a data collector, comprising:
receiving a first set of measurements collected by the GNSS receiver while facing a first direction and with a tip of the survey pole at a user-selected location;
receiving a second set of measurements collected by the GNSS receiver while facing a second direction offset from the first direction by a rotation angle and with the tip of the survey pole at the user-selected location;
with a calibration module, processing the first and second sets of measurements to calculate a set of corrections including at least one of a pitch correction, a roll correction, and a yaw correction; and
processing output of the IMU to measure rotation of the GNSS receiver and operating a display of the data collector to show the measured rotation of the GNSS receiver to indicate when the survey pole has been rotated through the rotation angle.

25. The method of claim 24, wherein the first and second sets of measurements include sensor attitude measurements provided by the IMU and wherein the set of corrections are calculated based on the sensor attitude measurements.

26. The method of claim 24, wherein the rotation angle is 180 degrees and wherein the display is operated to display the measured rotation and a graphical display element showing when the measured rotation is within a predefined window about 180 degrees of rotation in which the GNSS receiver can be operated to collect the second set of measurements.

27. The method of claim 24, further including using output of the IMU to update the display of the data collector to show an amount of tilt of the survey pole and wherein the first and second sets of measurements are collected only when the survey pole is tilted less than 3 degrees from vertical.

28. The method of claim 24, wherein the processing of the first and second sets of measurements includes determining first and second mounting angles between an axis of the survey pole and first and second vectors orthogonal to attitude of the GNSS receiver measured by the IMU and wherein the set of corrections correct for a non-zero value of the first and second mounting angles.

29. A field calibration method for a survey system including a survey pole, a GNSS receiver with an IMU mounted to the survey pole, and a data collector, comprising:
receiving a first set of measurements collected by the GNSS receiver while facing a first direction and with a tip of the survey pole at a user-selected location;
receiving a second set of measurements collected by the GNSS receiver while facing a second direction offset from the first direction by a rotation angle and with the tip of the survey pole at the user-selected location; and
with a calibration module, processing the first and second sets of measurements to calculate a set of corrections including at least one of a pitch correction, a roll correction, and a yaw correction,
wherein the processing of the first and second sets of measurements includes determining first and second mounting angles between an axis of the survey pole and first and second vectors orthogonal to attitude of the GNSS receiver measured by the IMU, and
wherein the set of corrections correct for a non-zero value of the first and second mounting angles.

30. The method of claim 29, wherein the first and second sets of measurements include sensor attitude measurements provided by the IMU and wherein the set of corrections are calculated based on the sensor attitude measurements.

31. The method of claim 29, further including processing output of the IMU to measure rotation of the GNSS receiver and operating a display of the data collector to show the measured rotation of the GNSS receiver to indicate when the survey pole has been rotated through the rotation angle, wherein the rotation angle is 180 degrees and wherein the display is operated to display the measured rotation and a graphical display element showing when the measured rotation is within a predefined window about 180 degrees of rotation in which the GNSS receiver can be operated to collect the second set of measurements.

32. The method of claim 29, further including processing output of the IMU to measure rotation of the GNSS receiver, operating a display of the data collector to show the measured rotation of the GNSS receiver to indicate when the survey pole has been rotated through the rotation angle, and using output of the IMU to update the display of the data collector to show an amount of tilt of the survey pole, wherein the first and second sets of measurements are collected only when the survey pole is tilted less than 3 degrees from vertical.

33. A system for performing field calibration of a survey system, comprising:
memory storing a first set of samples measured by a GNSS receiver with an embedded IMU while facing a first direction and with a tip of the survey pole at a user-selected location and further storing a second set of samples measured by the GNSS receiver while facing a second direction offset from the first direction by a rotation angle and with the tip of the survey pole at the user-selected location;
a processor managing the memory; and
a calibration module, run by the processor, processing the first and second sets of samples to calculate a set of corrections for use by the GNSS receiver when determining a position of the tip of the survey pole based on later-collected measurements,
wherein the calibration module processes output of the IMU to measure rotation of the GNSS receiver and, in response, operates a display to show the measured rotation of the GNSS receiver to indicate when the survey pole has been rotated through the rotation angle.

34. The system of claim 33, wherein the first and second sets of samples include sensor attitude measurements provided by the IMU and wherein the set of corrections are calculated based on the sensor attitude measurements.

35. The system of claim 33, wherein the display is operated to display the measured rotation and a graphical display element showing when the measured rotation is within a predefined window about value of the rotation angle in which the GNSS receiver can be operated to collect the second set of samples.

36. The system of claim 33, wherein the calibration module uses output of the IMU to update the display to show an amount of tilt of the survey pole and wherein the first and second sets of samples are collected only when the survey pole is tilted less than 3 degrees from vertical.

37. The system of claim 33, wherein the processing of the first and second sets of samples includes determining first and second mounting angles between an axis of the survey pole and first and second vectors orthogonal to attitude of the GNSS receiver measured by the IMU and wherein the set of corrections correct for a non-zero value of the first and second mounting angles.

38. A system for performing field calibration of a survey system, comprising:
   memory storing a first set of samples measured by a GNSS receiver with an embedded IMU while facing a first direction and with a tip of the survey pole at a user-selected location and further storing a second set of samples measured by the GNSS receiver while facing a second direction offset from the first direction by a rotation angle and with the tip of the survey pole at the user-selected location;
   a processor managing the memory; and
   a calibration module, run by the processor, processing the first and second sets of samples to calculate a set of corrections for use by the GNSS receiver when determining a position of the tip of the survey pole based on later-collected measurements,
   wherein the processing of the first and second sets of samples includes determining first and second mounting angles between an axis of the survey pole and first and second vectors orthogonal to attitude of the GNSS receiver measured by the IMU, and
   wherein the set of corrections correct for a non-zero value of the first and second mounting angles.

39. The system of claim 38, wherein the first and second sets of samples include sensor attitude measurements provided by the IMU and wherein the set of corrections are calculated based on the sensor attitude measurements.

40. The system of claim 38, wherein the calibration module processes output of the IMU to measure rotation of the GNSS receiver and, in response, operates a display to show the measured rotation of the GNSS receiver to indicate when the survey pole has been rotated through the rotation angle and wherein the display is operated to display the measured rotation and a graphical display element showing when the measured rotation is within a predefined window about value of the rotation angle in which the GNSS receiver can be operated to collect the second set of samples.

41. The system of claim 38, wherein the calibration module processes output of the IMU to measure rotation of the GNSS receiver and, in response, operates a display to show the measured rotation of the GNSS receiver to indicate when the survey pole has been rotated through the rotation angle, wherein the calibration module uses output of the IMU to update the display to show an amount of tilt of the survey pole, and wherein the first and second sets of samples are collected only when the survey pole is tilted less than 3 degrees from vertical.

* * * * *